Jan. 12, 1960  R. V. KEERAN  2,921,304
SEMI-AUTOMATIC SIGNAL AMPLITUDE RECORDER
Filed Oct. 3, 1952  2 Sheets-Sheet 1
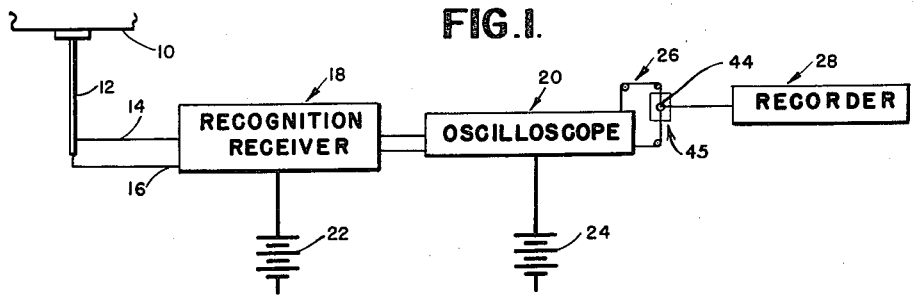
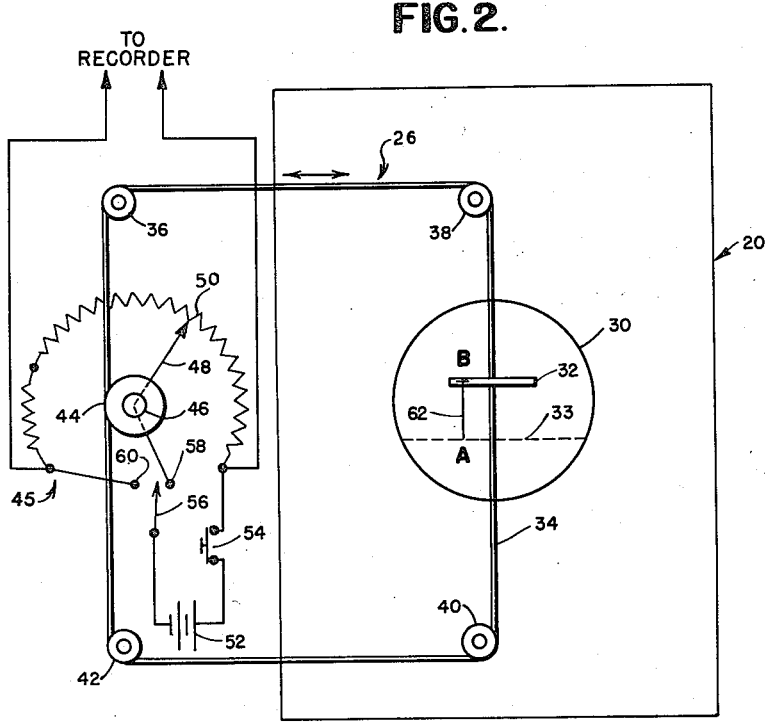
INVENTOR.
Royal V. Keeran
BY George Lipkin
George E. Pearson
Attorneys Jan. 12, 1960   R. V. KEERAN   2,921,304
SEMI-AUTOMATIC SIGNAL AMPLITUDE RECORDER
Filed Oct. 3, 1952   2 Sheets-Sheet 2

INVENTOR.
Royal V. Keeran
BY George Sipkin
George E. Pearson
Attorneys

United States Patent Office 2,921,304
Patented Jan. 12, 1960

2,921,304

SEMI-AUTOMATIC SIGNAL AMPLITUDE RECORDER

Royal V. Keeran, San Diego, Calif.

Application October 3, 1952, Serial No. 313,093

8 Claims. (Cl. 343—17.7)

(Granted under Title 35, U.S. Code (1952), sec. 266)

The invention described herein may be manufactured and used by or for the Government of the United States of America for governmental purposes without the payment of any royalties thereon or therefor.

This invention relates to apparatus and a method for determining and recording the field intensity of electromagnetic radiation and more particularly to such apparatus and a method for ascertaining radar blind zones.

It has been well known for some time that the field intensity of a radar station, particularly those transmitting horizontally polarized waves in the lower radar frequency range, varies in space in such a manner as to produce blind zones of zero or low field intensity which exist between radiation lobes of relatively high field intensity. In making field intensity measurements from the transmitting station, it is difficult, if not impossible, to obtain an accurate measurement of the changes in field intensity in space so as to determine the blind zones with respect to a target such as an airplane approaching the transmitting station, since the blind zones appear broader or more extended due to the weaker field returned compared to the field experienced at a target in space.

In accordance with one preferred form of the present invention, an airplane is equipped with a receiving dipole which is mounted broadside with respect to the direction of flight and is connected to a conventional recognition receiver which in turn transmits the pulses to the vertical deflection plates of a cathode ray oscilloscope having its horizontal deflection plates affected by the customary sawtooth sweep to produce one or more vertical pips which appear to be standing still on the screen of the tube. An electro-mechanical arrangement is provided consisting of a pointer positioned before the cathode ray tube and fixed to a driving cord which extends over a series of pulleys, one of which is connected to the shaft of a potentiometer in an electrical circuit with a recording galvanometer. This apparatus translates the height of the pip into a record trace of field intensity plotted against time which may be compared to a similar record of the echo signal of the transmitter, if desired, and analyzed to determine the pattern of the field intensity.

One object of the present invention is to provide a method of accurately determining the variations of field strength in space surrounding a transmitting station.

A further object of the present invention is to provide apparatus for measuring and recording the variations of field intensity on an aircraft traversing the field of a shore controlled radar station or other source of electro-magnetic waves.

Other objects and many of the attendant advantages of this invention will be readily appreciated as the same becomes better understood by reference to the following detailed description when considered in connection with the accompanying drawings wherein:

Fig. 1 is a schematic view showing the general arrangement of the apparatus of the present invention;

Fig. 2 is a combined schematic and circuit diagram of the oscilloscope and potentiometer translating device.

Figure 3:
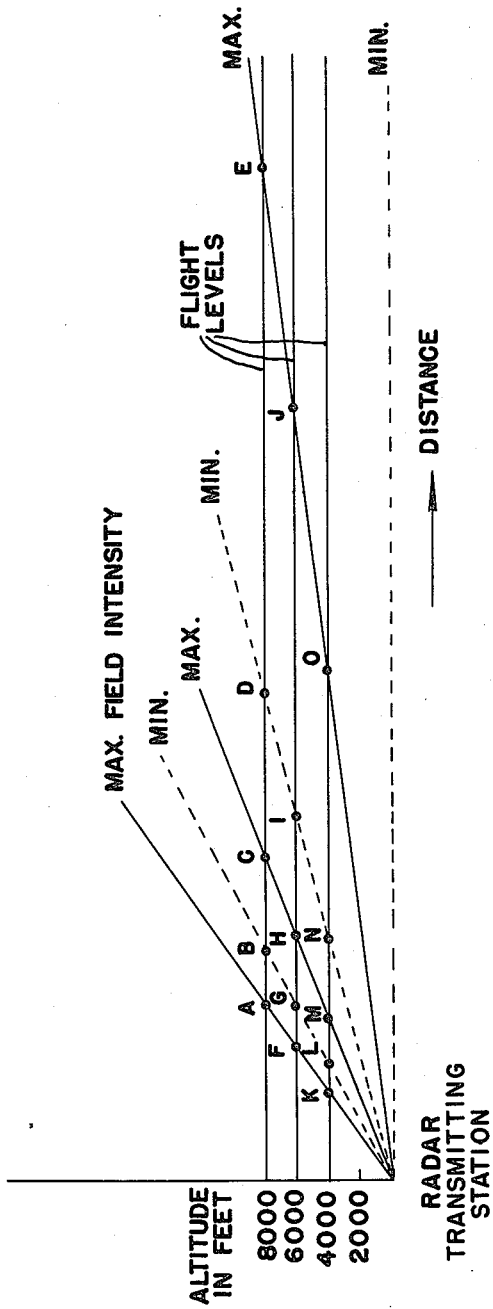
Fig. 3 is a graphical representation of one preferred method of making a survey of the field intensity.

Referring now to the drawings in detail, and more particularly to Fig. 1, a dipole directional receiving antenna 10 is adapted to pick up the signals transmitted from a fixed station and transmit them through a coaxial cable 12 and leads 14 and 16 to a conventional recognition receiver 18 such as a three-stage amplifier tuned to the frequency of the transmitting station.

The output from the receiver 18 is fed to the vertical deflection plates (not shown) of an oscilloscope 20 which is provided with the conventional horizontal deflection plates (not shown) affected by the customary saw-tooth sweep so that the received signals produce one or more vertical pips which are observed standing still on the screen of the cathode ray tube. The receiver 18 and oscilloscope 20 are provided with suitable sources of power such as the batteries 22 and 24 respectively.

A cable and pulley arrangement 26 is more clearly illustrated in detail in Fig. 2 and provides a signal voltage to a recording galvanometer 28 such as an Esterline-Angus recorder, (not shown), the signal being proportional to the height of the pip on the screen 30 of the cathode ray tube constituting a part of the oscilloscope 20. A pointer 32 which may consist of a clear plastic arm with a fine marking thereon is attached transversely to a cable 34 which extends over the pulleys 36, 38, 40 and 42 and also around a pulley 44 which is mounted on the shaft of a potentiometer 45 having a control knob 46.

The potentiometer is preferably a rotary type having a rotary contact 48 which engages the resistance 50 and thus varies the current from the battery 52 to the recorder when the push button switch 54 is closed and the switch 56 is engaging the contact 58. Switch 56 may also be thrown to engage a contact 60 to cause a large scale offswing of the recording pen at regular intervals, thus providing a time mark on the record chart.

It will be obvious that the pointer 32 can be moved by rotation of the knob 46 until the mark thereon is even with the top of the pip 62 and thus provide a signal to the recorder which in turn will make a record trace graphically portraying variations in the amplitude of the received signal and thus the field intensity at the airplane. The dotted line 33 is the base line of the pip 62 and the pointer may be set on this line for a zero adjustment of the recorder.

In carrying out one preferred method of measuring the field intensity, the apparatus described supra is mounted on a plane which is flown in a straight line away from and toward the transmitting station at various elevations, as indicated in Fig. 3 at 4,000; 6,000; and 8,000 feet respectively. If the plane is flown at a substantially constant speed with respect to the ground or water, but preferably over a relatively flat surface, the values of the field intensity may be plotted with respect to distance to provide a chart such as that shown in Fig. 3 which portrays the space variations in field intensity. Such tests and measurements of field intensity have shown a pattern wherein the maximum field intensities and minimum field intensities lie in substantially straight lines as shown. However, the chart is somewhat exaggerated since the angle between the OJE maximum line and the MHC maximum line is in reality only about one degree and 40 minutes for an antenna of 65 feet elevation.

If desired, simultaneous echo pip readings can be recorded at the radar station in a similar manner, or the radar operator may take check measurements at full height, ¾ height, ½ height and ¼ height to plot the field intensity against time as it appears at the transmitting station. The patterns obtained on the plane and at the radar transmitting station may then be compared by plotting them to the same scale and the charts may be analyzed to determine the variations or space pattern of the field intensities in a plane extending outwardly from the transmitting station. It will be apparent that such investigations may be conducted along a number of radial planes, if it is desired to find the complete three-dimensional space pattern.

Obviously many modifications and variations of the present invention are possible in the light of the above teachings. It is therefore to be understood that within the scope of the appended claims the invention may be practiced otherwise than as specifically described.

What is claimed is:

1. Apparatus for recording field intensity comprising electronic means to detect a desired input signal and translate said input signal into a visible pattern having one dimension varying in proportion to the strength of said input signal, a movable indicator positioned adjacent said pattern, means for moving said indicator longitudinally with respect to said dimension, an electrical circuit including means for varying the output signal of said circuit operatively associated with said moving means, an automatic recording device operatively associated with said circuit for recording said output signal, said circuit including means for disabling said output signal varying means and simultaneously feeding a time signal to said recording device.

2. Apparatus for recording field intensity comprising an antenna, a receiver operatively connected to said antenna and adapted to detect and amplify a desired signal, an electronic device operatively connected to said receiver and adapted to translate said signal into a visible pattern varying proportionately with the strength of said signal, a plurality of pulleys, a cable extending across said pattern and trained over certain of said pulleys and around one of said pulleys, a pointer secured transversely to said cable adjacent said pattern, an electrical circuit including a potentiometer mounted coaxially with said one pulley and movable therewith for varying the resistance in said circuit, a source of electrical energy in said circuit, an automatic recording device operatively associated with said circuit for recording the electrical energy output of said circuit, and a switch for disconnecting said potentiometer from said circuit and directly connecting said source with said recording device to provide a marker signal.

3. Apparatus for recording field intensity comprising a directional antenna, a receiver operatively connected to said antenna and adapted to detect and amplify a desired signal, an oscilloscope having a cathode ray tube operatively connected to said receiver and adapted to translate said signal into a visible pip varying in height in proportion to the strength of said signal, a plurality of pulleys, a cable extending across the face of said tube and trained over certain of said pulleys and around one of said pulleys, a pointer secured transversely to said cable in front of the screen of said tube, said cable being movable upon rotation of said one pulley in a direction parallel to the pip formed on said screen whereby the pointer may be positioned at the top of said pip, an electrical circuit including a rotary potentiometer mounted coaxially with said one pulley and movable therewith for varying the resistance in said circuit, a battery in said circuit, an automatic recording device, and means for alternatively coupling said recording device to said battery directly or through said potentiometer.

4. A device for recording variations of a signal visually indicated on a screen comprising a plurality of pulleys, a cable extending over certain of said pulleys and around one of said pulleys, one portion of said cable extending across said screen, a pointer secured transversely to said portion of said cable in front of said screen, said one pulley being provided with a control knob for moving said cable and pointer across said screen, an electrical circuit including a potentiometer operatively connected to said one pulley for movement therewith, a source of electrical energy in said circuit, a recorder adapted to automatically record the variations of the signals generated in said circuit by movement of said potentiometer, and a switch for selectively connecting said recorder to said source directly or through said potentiometer whereby said recorder may be alternatively actuated in accordance with said visual signal or directly by said source.

5. A device for recording variations of signal intensity comprising an oscilloscope adapted to form on the screen thereof a vertical line whose height is proportional to the signal strength, a plurality of pulleys, a cable extending over certain of said pulleys and around one of said pulleys, one portion of said cable extending across said screen and parallel to said line, a pointer secured transversely to said portion of said cable in front of said screen, and one pulley being provided with a control knob for moving said cable and pointer across said screen, an electrical circuit including a rotary potentiometer operatively connected to said one pulley for rotation therewith, a battery in said circuit, and a recorder adapted to automatically record the variations of the signals from said circuit, said circuit including means for disabling said potentiometer and simultaneously coupling said battery directly to said recorder.

6. A method of determining the pattern of field intensity surrounding a transmitting station comprising flying a plurality of transverses at uniform speed and at different elevations in a plurality of radial planes receiving signals from said station during said traverses, displaying pips of said received signals, manually following said pips and generating a voltage which varies in accordance with the height thereof, recording said voltage thereby to record variations of field intensity as indicated by variations in the intensity of said received signals and regular intervals of time, receiving at said station echoes of said signals reflected from points on said traverses, recording variations of field intensity as indicated by the intensity of echoes received at said time intervals, and plotting the maximum and minimum field intensities indicated by both recordings on a chart of altitude against radial distance in one or more planes extending radially from the transmitting station.

7. A method of determining the space radiation pattern of radar station comprising transmitting signals from said station, receiving and displaying pips of said signals at selected times at points along a plurality of traverses at different elevations in at least one radial plane containing said station, manually following said pips and generating a voltage which varies in accordance with the height thereof, recording said voltage thereby to record recording variations in field intensity as indicated by variations in the intensity of signals received at said points, receiving and displaying at said station echoes and pips respectively of signals reflected from said points, manually following said echo pips and generating an echo voltage which varies in accordance with the height thereof, recording said echo voltage thereby to record variations of field intensity as indicated by variations in the intensity of echoes received at said selected times, and plotting to the same scale variations of field intensity indicated by both said recordings.

8. Apparatus for measuring and recording the radiation pattern of electromagnetic energy radiated from a fixed point comprising, in combination, an aircraft, means on the aircraft for producing a visible signal pip which varies in height in accordance with changes in intensity of said radiated energy as the aircraft moves from point to point along a predetermined traverse within the field of said radiations, circuit means including a source of electrical energy and a member positionable in accordance with the height of said signal for producing a voltage which varies proportionally therewith, means normally connected to said circuit means and including a recording pen and paper for recording said voltage, and switch means for disconnecting said signal producing means from said circuit means and connecting said source directly to said recording means selectively at will at spaced intervals of time to provide time-marking voltage excursions of said pen on said recording paper relative to said recorded voltage.

References Cited in the file of this patent

UNITED STATES PATENTS

| | | |
|---|---|---|
| 1,300,525 | Warren | Apr. 15, 1919 |
| 2,240,639 | Derr | May 6, 1941 |
| 2,394,990 | Eisler | Feb. 19, 1946 |
| 2,427,019 | Norwood | Sept. 9, 1947 |
| 2,479,569 | Harschel | Aug. 23, 1949 |
| 2,528,142 | Herzlinger | Oct. 31, 1950 |
| 2,539,553 | Rich | Jan. 30, 1951 |
| 2,610,226 | Klaasse | Sept. 9, 1952 |

OTHER REFERENCES

I.R.E. Proceedings, November 1951, pp. 1374–1388.
Proceedings of the I.R.E., April 1940, pp. 175–179.
Radar System Engineering, vol. 1, Radiation Laboratory Series, MIT, published by McGraw-Hill Book Company, Inc., 1947, pp. 177, 178, 184, 185.